United States Patent
Davey et al.

(10) Patent No.: US 8,948,313 B2
(45) Date of Patent: Feb. 3, 2015

(54) METHOD AND APPARATUS FOR ADJUSTING A SYMBOL DECISION THRESHOLD AT A RECEIVER IN A COMMUNICATION NETWORK

(75) Inventors: Jonathan Davey, Kanata (CA); Wang-Hsin Peng, Ottawa (CA)

(73) Assignees: LG-Erricsson Co., Ltd. (KR); Rockstar Consortium USLP, Plano, TX (US)

( * ) Notice: Subject to any disclaimer, the term of this patent is extended or adjusted under 35 U.S.C. 154(b) by 195 days.

(21) Appl. No.: 12/690,196

(22) Filed: Jan. 20, 2010

(65) Prior Publication Data

US 2011/0176638 A1 Jul. 21, 2011

(51) Int. Cl.
H04L 25/06 (2006.01)

(52) U.S. Cl.
CPC .............. *H04L 25/061* (2013.01); *H04L 25/06* (2013.01); *H04L 25/069* (2013.01)
USPC ............................................. 375/317; 398/27

(58) Field of Classification Search
USPC .............................. 375/225, 317; 398/27, 209
See application file for complete search history.

(56) References Cited

U.S. PATENT DOCUMENTS

| | | | |
|---|---|---|---|
| 6,513,136 B1 | 1/2003 | Barker | |
| 6,625,772 B1 | 9/2003 | Stoll | |
| 6,885,828 B1 | 4/2005 | Cornelius | |
| 7,062,165 B2 * | 6/2006 | Brissette et al. | 398/27 |
| 2009/0254796 A1 * | 10/2009 | Hassner et al. | 714/780 |
| 2010/0070679 A1 * | 3/2010 | Coonen et al. | 711/102 |

FOREIGN PATENT DOCUMENTS

| | | |
|---|---|---|
| EP | 1085713 | 3/2001 |
| JP | 2002-77111 | 3/2002 |

OTHER PUBLICATIONS

Written Opinion of the International Searching Authority from corresponding PCT application PCT/CA2011/000061.

* cited by examiner

*Primary Examiner* — Leon-Viet Nguyen
(74) *Attorney, Agent, or Firm* — Anderson Gorecki & Rouille LLP

(57) ABSTRACT

A method and apparatus for adjusting a symbol decision threshold at a receiver in a communication network enables the receiver to be adapted to more correctly receive symbols as transmitted by a transmitter. In one embodiment, a received bit imbalance is detected by a receiver prior to error correction and after error correction to determine whether an error component of the received signal contains larger numbers of ones or larger numbers of zeros. Where the transmitter scrambles the signal prior to transmission, the receiver will also scramble the signal after error correction and prior to counting the number of zeros or ones. Any imbalance between the number of transmitted and received ones or zeros is used as feedback to adjust threshold values used by detectors to fine tune the manner in which the receiver interprets incoming signals.

16 Claims, 4 Drawing Sheets

(Threshold Correct)

(Threshold too high)

(Threshold too low)

METHOD AND APPARATUS FOR ADJUSTING A SYMBOL DECISION THRESHOLD AT A RECEIVER IN A COMMUNICATION NETWORK

TECHNICAL FIELD

The present invention relates to communication networks, and, more particularly, to a method and apparatus for adjusting a symbol decision threshold at a receiver in a communication network.

BACKGROUND

Data communication networks may include various routers and switches coupled together and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, commonly referred to as protocols. Different protocols are used to govern different aspects of the communication, such as how signals should be formed for transmission between network elements, various aspects of what the protocol data units should look like, how protocol data units should be handled or routed through the network by the network elements, and how information such as routing information should be exchanged between the network elements.

At the physical layer, in a digital communication network, the network elements transmit and receive binary signals that represent either zeros or ones. There are several ways that this may be implemented, depending on the type of physical media being used to transport the signals. Where the network elements are communicating over an optical fiber 14, for example as shown in FIG. 1A, the transmitter 10 may transmit binary signals by turning a laser on and off. Where an electrically conductive physical medium 16 is used, as shown in FIG. 1B, the binary signals may be formed by adjusting a voltage on the conductor. Where the network elements are communicating using a wireless protocol as shown in FIG. 1C, the binary signals may be encoded onto the carrier frequency 18 being used by the network elements to communicate with each other. Regardless of the particular physical medium in use, the transmitter 10 will transmit a series of zeros and ones which will be received by the receiver 12, so that the transmitter is able to convey information to the receiver.

When a signal is transmitted on a fiber, electrical cable, wireless carrier, etc., it is possible for the signal to be distorted during transmission. Thus, when the receiver receives the signal, there is a possibility that the received signal will include an error component. Likewise, the receiver and transmitter are generally required to operate at the same frequency so that the receiver reads data from the signal at the same rate that the transmitter transmitted the data on the signal. An explicit clocking signal may be used to synchronize the transmitter and receiver or, alternatively, the receiver may extract synchronization information from the received waveform.

FIG. 2 shows an example transmitter/receiver combination that may be used to transmit data between a transmitter 10 and receiver 12 over an optical, electrical, or wireless physical medium. The example shown in FIG. 2 is designed to enable the receiver to correct errors introduced during transmission and to also extract a clocking signal from the received signal.

Specifically, as shown in FIG. 2, a transmitter 10 will encode a signal to be transmitted using an encoder 20. The encoder allows information to be added to the signal that will enable the receiver to recover the original signal free from errors that may occur during transmission. There are several known encoding schemes of this nature, including Reed-Solomon, Turbo, and Bose, Ray-Chaudhri, Hocquenghem (BCH) encoding schemes. Other encoding schemes may exist as well. Reed-Solomon error correction, for example, operates by oversampling a polynomial constructed from the data to be transmitted. The polynomial is evaluated at several points, and these values are transmitted as signal S. Sampling the polynomial more often than is necessary makes the polynomial over-determined. As long as the receiver receives many of the points correctly, the receiver can recover the original polynomial even in the presence of a few bad points. Hence, the receiver 12 can use RS-8 error corrector 24 to recover the original polynomial used by encoder 20 and, hence, can recreate the original data that was used to create the polynomial free from any errors that may have occurred during transmission. Other error correction techniques may use different methods to enable the original data to be recovered at a receiver free from errors that may occur during transmission as is known in the art.

The transmitter/receiver pair shown in FIG. 2 is also configured to detect clock timing information from the incoming signal so that the receiver knows the frequency with which to read information from the physical medium. If the receiver is not operating at the same frequency as the transmitter, it may introduce errors into the received signal which is undesirable. Generally the receiver will use a Phase Locked Loop (PLL) or other similar structure to lock onto the transmission frequency being used by the transmitter 10. Since PLLs and other synchronization circuits are well known in the art, the actual clock extraction portion has not been shown in FIG. 2 to avoid obfuscation of the other portions of the drawing.

In a system where the receiver relies on extracting the clocking frequency from the input signal, it is important for the input signal to not include a long string of zeros or a long string of ones, since this may cause the receiver to lose synchronization with the transmitter. Specifically, a long string of zeros or ones will be seen by the receiver as a constant voltage on the electrically conductive wire or as a constant light/dark signal on an optical fiber. A constant value does not have any transitions between states (e.g. high/low voltage or on/off light) which is what the PLL uses to determine the transmission frequency. Hence, a prolonged period without state transition does not provide the PLL or other synchronization circuit with information as to the frequency in use by the transmitter and can cause the receiver to lose synchronization with the transmitter.

Accordingly, to avoid transmission of long sequences of zeros or long sequences of ones, it is common for the transmitter to scramble the output signal (S), for example using a Linear Feedback Shift Register (LFSR) scrambler 22. A linear feedback shift register is a shift register whose input bit is a linear function of its previous state. Fibonacci LFSRs and Galois LFSRs are two common implementations of LFSRs. The LFSRs may have a set number of places in the register, e.g. 16, and if properly designed will cycle through all possible values of the register to randomize the output such that the output from the scrambler f(S) is not likely to contain long strings of all zeros or all ones. As shown in FIG. 2, the receiver will use the same scrambler 22 to unscramble the signal to remove the contribution from the scrambler prior to decoding the signal using error corrector 24. As noted above, the error corrector will remove errors that may have occurred in the signal during transmission.

There are several sources of error that may contribute to corruption of the signal during transmission between the transmitter and receiver. For example, the signals may become weaker over time/distance. Likewise, external sources of noise may be added to the signal so that the signal received by the receiver may have other components in addition to the intended data output by the transmitter. The receiver is responsible for detecting the signal and making a decision, at the clocking frequency, as to whether the signal on the physical medium is a zero or a one. Typically, the receiver will use a threshold to make this decision—if the received signal is above the threshold the signal is interpreted as a one and, conversely, if the received signal is below the threshold the signal is interpreted as a zero. If the receiver does not implement this process correctly, the thresholding process at the receiver may likewise be a source of error. Accordingly, it would be desirable to be able to adjust the thresholding process at the receiver to improve the fidelity of signals received by the receiver on a communication network.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A method and apparatus for adjusting a symbol decision threshold at a receiver in a communication network enables the receiver to be adapted to more correctly receive symbols as transmitted by a transmitter. In one embodiment, a received bit imbalance is detected by a receiver prior to error correction and after error correction to determine whether an error component of the received signal contains larger numbers of ones or larger numbers of zeros. Where the transmitter scrambles the signal prior to transmission, the receiver will also scramble the signal after error correction and prior to counting the number of zeros or ones. Any imbalance between the number of transmitted and received ones or zeros is used as feedback to adjust threshold values used by detectors to fine tune the manner in which the receiver interprets incoming signals.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1A:
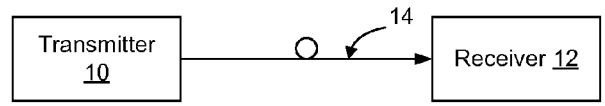
FIGS. 1A-1C are functional block diagrams showing several transmitter/receiver pairs utilizing different physical transmission media.
Figure 1B:
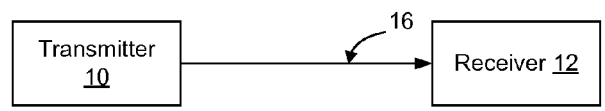
Figure 1C:
Figure 2:
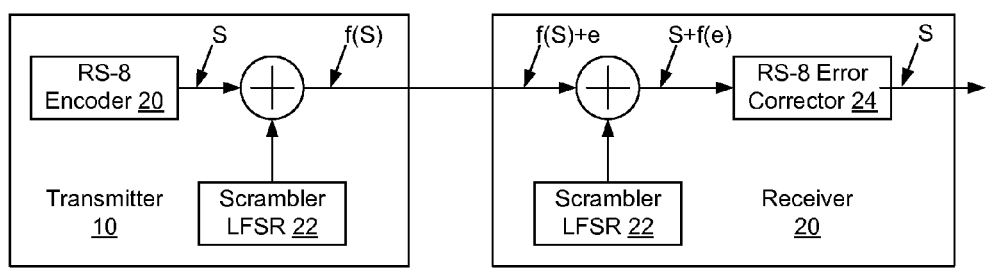
FIG. 2 is a functional block diagram of a conventional transmitter/receiver pair.
Figure 3:
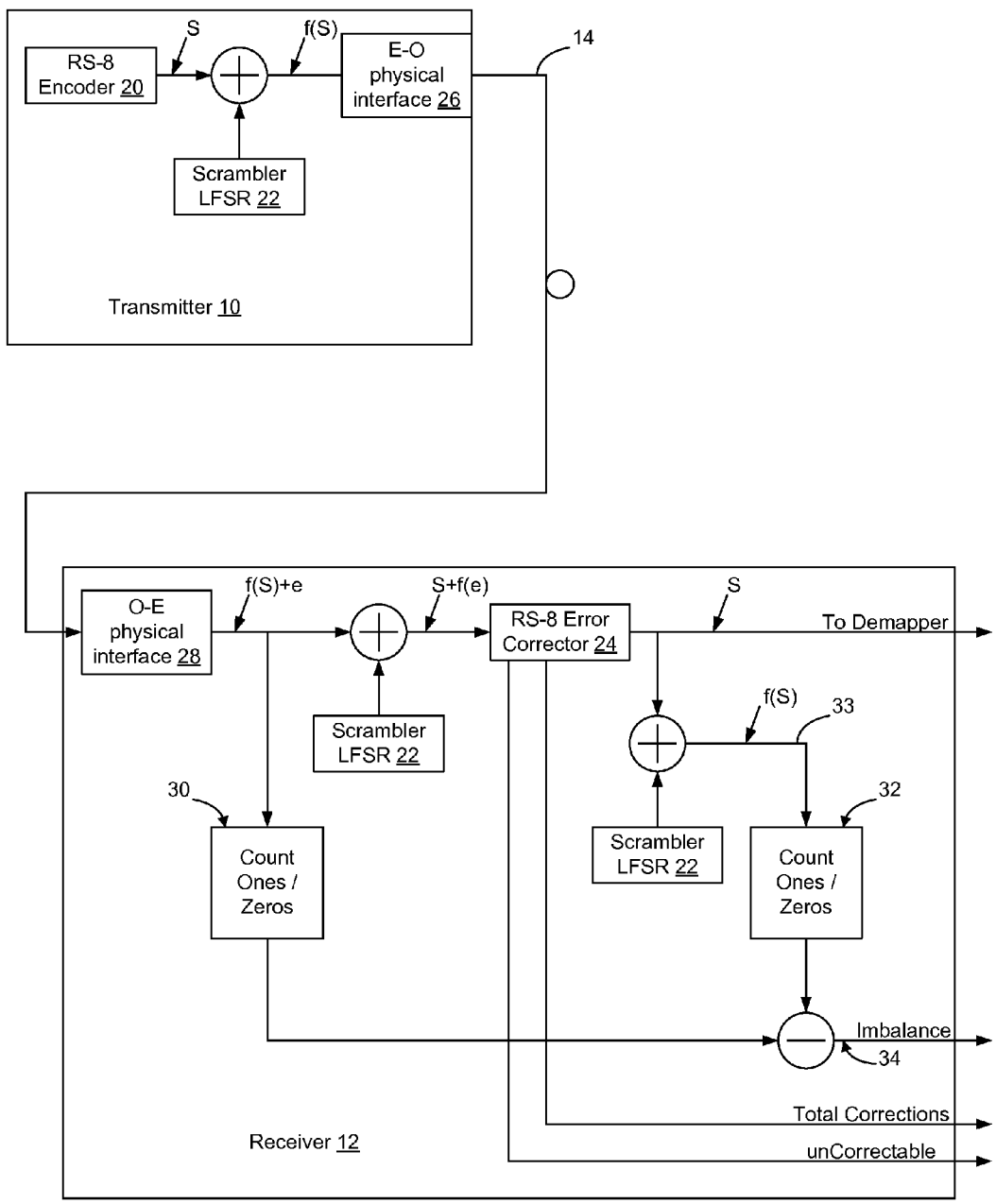
FIG. 3 is a functional block diagram of a transmitter/receiver pair according to an embodiment of the invention.

FIG. 3 shows an example embodiment of a transmitter/receiver pair according to an embodiment of the invention. The transmitter, in this embodiment, is the same as the transmitter shown in FIG. 2. However, the receiver is constructed differently to enable the receiver to determine the type of errors that occur during transmission and use this information to adjust thresholds of the receiver interface to balance the number of errors of each type (e.g. number of zero errors and number of one errors). By balancing the number of incorrect zeros that are received with the number of incorrect ones that are received, errors due to improper thresholding may be reduced to thereby tune the receiver to more correctly sense the received signal on the physical channel.

In FIG. 3, the transmitter 10 includes a Reed-Solomon 8 encoder 20 to encode the signal to create signal S to be transmitted on optical fiber 14. Other types of encoders may be used as well and the RS-8 encoder is illustrated as merely one example of a possible encoder that may be utilized by the transmitter. The encoder receives data to be transmitted and creates signal S to be transmitted on the communication network. The error corrector 24 at receiver 12 will remove errors from signal S. Likewise, although FIG. 3 has been illustrated to show an optical channel interconnecting the transmitter and receiver, other types of physical channels may be used as well and the invention is not limited to use with an optical embodiment. The transmitter 10 further includes scrambler 22 which may be implemented as a 16 bit LFSR scrambler or other type of scrambler. The scrambler creates a function f(S) of the signal S from error corrector 20. In an embodiment where an optical signal is to be used to transmit data between the transmitter and receiver, the signals f(S) will be sent to an Electrical to Optical physical interface 26 where the electrical signals will be used to modulate a laser to enable corresponding optical signals to be created and output onto fiber 14. Other types of physical interfaces would be used with other physical mediums.

Figure 4:
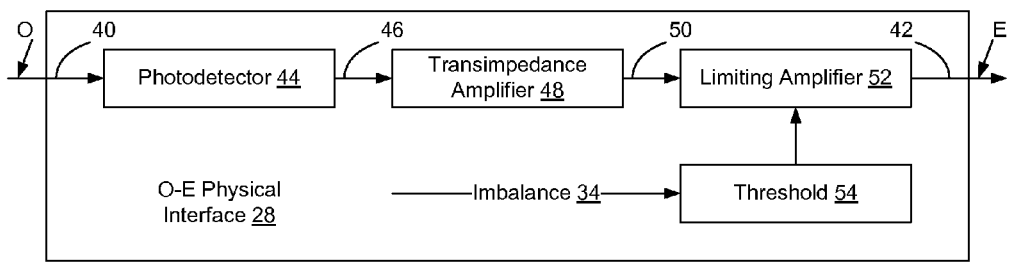
FIG. 4 is a functional block diagram of an example physical interface utilizing received bit imbalance as feedback in adjusting decision threshold according to an embodiment of the invention.

The receiver 12 has a corresponding Optical to Electrical physical interface 28, one embodiment of which is shown in FIG. 4. FIG. 4 will be discussed in greater detail below. The O-E physical interface 28 creates electrical signals which includes the original signal transmitted by the transmitter f(S) plus an error component e. The error component e may include artifacts introduced by the transmission medium as well as artifacts introduced by the physical interface 26 and physical interface 28. As described in greater detail below, according to an embodiment of the invention, an imbalance in the type of errors in the error component (e.g. false zeros and false ones) are detected and used to adjust thresholds of Optical to Electrical physical interface 28 to reduce the O-E interface's contribution to the amount of error included in signal f(S)+e.

As shown in FIG. 3, the receiver 12 has some of the same components as a conventional receiver shown in FIG. 2. Specifically, after the optical signals are converted to electrical signals, the signals are scrambled to recover the original signal. Since the signal includes an error component, the scrambler will also unscramble the error component of the signal to form signal S+f(e). This signal will then be passed to a error corrector 24 to remove the error component and recover the original signal S. In the illustrated embodiment a RS-8 error corrector is illustrated since that was the type of encoder utilized by the transmitter. The invention is not limited to use of a particular type of encoder/error corrector, as any type of error correction process may be utilized.

As shown in FIG. 3, the receiver will also count the number of zeros or ones output by the Optical to Electrical physical interface 28 to determine how many symbols of a particular type are included in the signal f(S)+e. A 32 bit register or other sized register may be used to count the number of zeros or ones in the signal, or another structure may be used to count the number of zeros or ones.

To determine how many of the counted ones or zeros are attributable to the error component e, the receiver will recreate the scrambled signal f(S) and count the number of zeros or ones in the recreated scrambled signal f(S). Note that the signal output from the decoder in the transmitter is the same as the signal output from the encoder of the transmitter. Thus, the scrambled signal output from the scrambler 22 in the receiver will be the same as the scrambled signal output from the scrambler 22 of the transmitter 10. Hence, the recreated scrambled signal 33 may be used to determine the composition of the error component. For example, as shown in FIG. 3, the receiver can count the number of zeros or ones in the recreated scrambled signal 33 and subtract that count from the number of zeros or ones counted in the received signal f(S)+e. This will indicate if the error signal contains more ones than zeros, or more zeros than ones.

Note, in this regard, that where the receiver counts the number of ones contained in received signal f(S)+e then the receiver will likewise count the number of ones contained in the recreated signal f(S). Conversely, where the receiver counts the number of zeros contained in received signal f(S)+e then the receiver will likewise count the number of zeros contained in the recreated signal f(S).

By comparing the number of ones in signal f(S)+e with the number of ones in the original scrambled signal f(S), the receiver 12 can determine whether the error signal contains an imbalance in the number of zeros or an imbalance in the number of ones. Since it may be expected that noise-based errors would be evenly distributed between zero errors and one errors, then a detected imbalance in the number of zero errors or one errors may be inferred to be caused by an incorrect thresholding process in the O-E physical interface. Specifically, it may be inferred that the imbalance is likely to have been caused because the thresholds used by the Optical to Electrical interface to interpret the input signal from fiber 14 are incorrectly set.

For example, if at the line interface there are more "false ones" errors than "false zeros", this would indicate that the O-E interface is incorrectly interpreting received signals as a one rather than a zero. Since the O-E interface compares the received signal against a threshold when making a decision as to whether the received signal is a one or a zero, an excess number of "false ones" would indicate that this threshold is too low and should be raised slightly. Likewise, if there are more "false zeros" than "false ones", the O-E interface is incorrectly not detecting the incoming signals as a zero value. This would indicate that the threshold in use at the O-E interface is too high and should be lowered slightly.

The receiver may count both zeros and ones, or may count only one of these values. Where only one of the symbols is counted, the manner in which the threshold moves will depend on how the counted values are combined and the sign of the result. For example, if the system counts ones, and the number of ones in the signal f(S)+e is subtracted from the signal f(S), then a negative number would indicate an excess number of ones in the error signal. Conversely, if the system counts ones and the number of ones in the signal f(S) is subtracted from the number of ones in the signal f(S)+e, than an excess number of ones in the error signal would be shown as a positive number. Thus, the particular manner in which the symbols are counted and the manner in which the two numbers are combined will determine how the threshold should be adjusted.

FIG. 4 shows an example optical to electrical physical interface 28 to help further explain how this may occur. As shown in FIG. 4, the O-E interface receives optical signals at input 40 and outputs electrical signals at output 42. The O-E interface is binary, such that the signal on output 42 will either have a high voltage value (a one) or a low voltage value (a zero). In operation, the light from optical fiber 14 (optical signal 40) is input to a photodetector 44 which generates a current 46. Different types of photodetectors have been developed, but in this example the photodetector outputs a current 46 which is proportionate to the amount of light input to the photodetector.

Current 46 is input to transimpedance amplifier 48 which converts the current to a voltage 50. Voltage 50 is input to limiting amplifier 52 which will output either a high voltage or low voltage (a zero or one) on output 42 depending on whether the input voltage 50 is larger than a threshold 54 or smaller than threshold 54. Other O-E physical interfaces may be used as well, and this interface is intended merely as an example interface that utilizes a threshold in connection with interpreting an incoming signal from a communication network. Other interfaces may be utilized as well depending on the particular implementation.

According to an embodiment, an imbalance 34 in the number of zero errors (or an imbalance in the number of one errors) is used to adjust threshold 54. As noted above, if there are too many "one" errors, this indicates that the O-E physical interface is incorrectly interpreting the signal 40 as a one where it should have interpreted the signal 40 as a zero. Accordingly, the threshold 54 used by the O-E physical interface is too low and should be increased. Likewise, if there are too many "zero" errors, this indicates that the O-E physical interface is incorrectly interpreting the signal 40 as a zero where it should have interpreted the signal 40 as a one. This indicates that the threshold is too high and should be reduced.

Figure 6A:
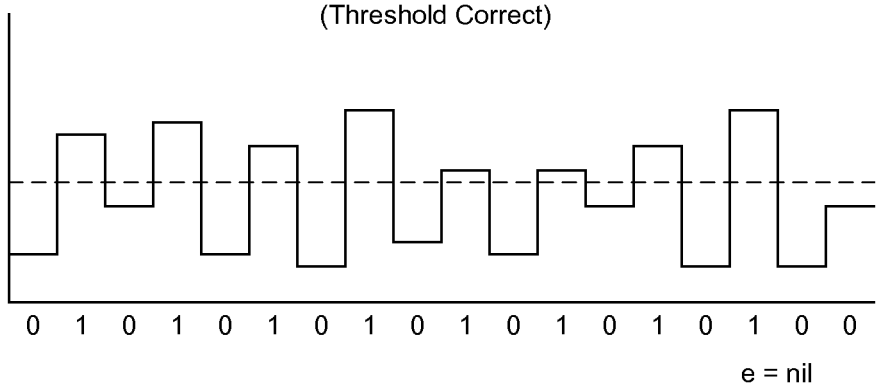
FIGS. 6A-6C show an example waveform and the effect of threshold variation on symbol decision according to an embodiment of the invention.
Figure 6B:
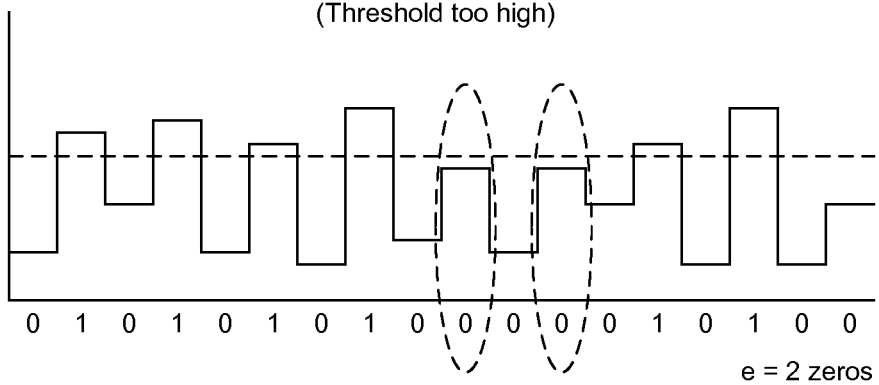
Figure 6C:
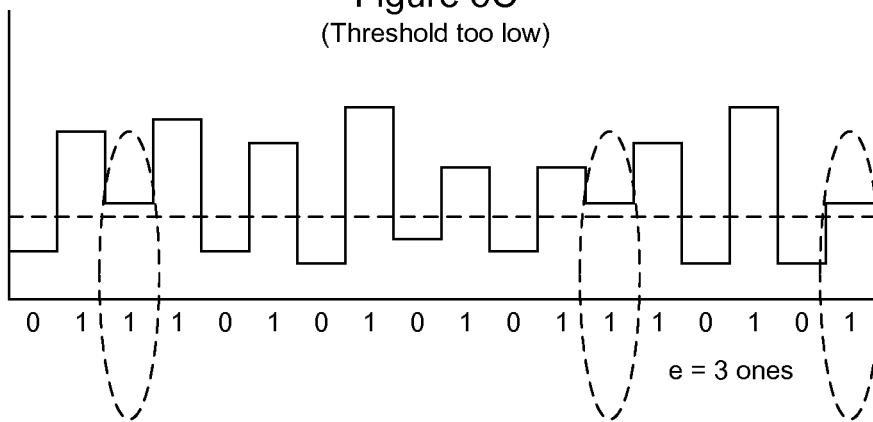

FIGS. 6A-6C show an example waveform that may be received by a physical interface such as the optical-electrical physical interface 28 of FIG. 4. FIGS. 6A-6C all show the same example waveform, but show different ways that the physical interface may interpret the waveform depending on the threshold. In FIG. 6A, the threshold is correct and the threshold level does not contribute to the error signal. In FIG. 6B, the threshold is too high. As noted in this diagram, if the threshold is too high the interface will occasionally incorrectly output a zero when it should have output a one. In this example, two zero errors have been circled where the high threshold caused two zero errors to occur. Likewise in FIG. 6C the threshold has been set to be too low. When the threshold is too low, the interface is more likely to output a one, and hence may occasionally incorrectly output a one when it should output a zero. In this example, three one errors have been circled where the low threshold caused the three one errors to occur.

According to an embodiment of the invention, by recreating the original signal f(S), the receiver is able to compare the original signal f(S) with the received signal f(S)+e to determine whether there is an imbalance of zeros or an imbalance of ones. This, then, may be used to adjust the threshold of the O-E physical interface.

Figure 5:
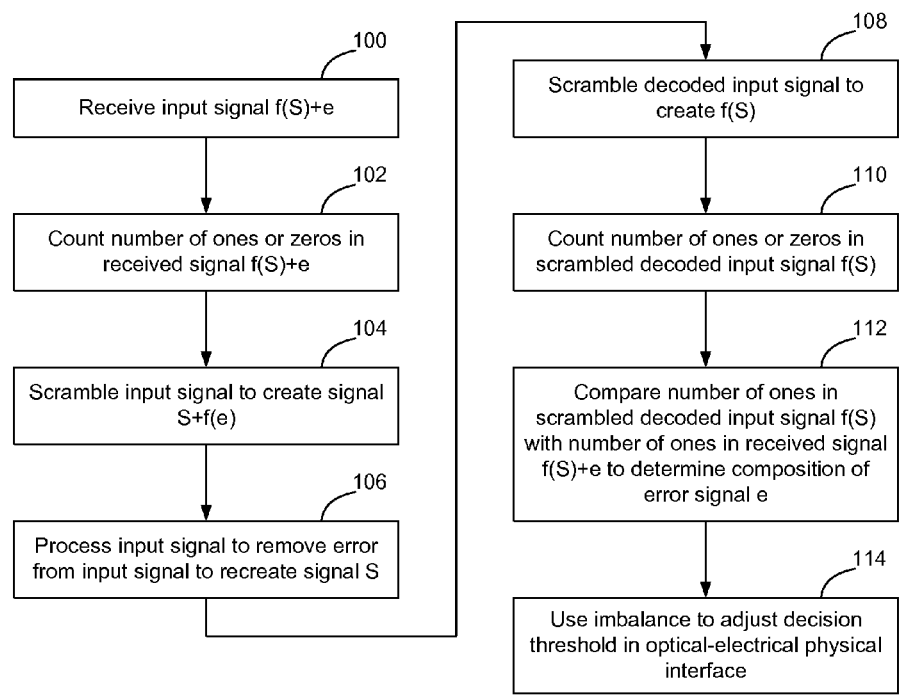
FIG. 5 is a flow chart of a process of adjusting a symbol decision threshold at a receiver in a communication network according to an embodiment of the invention.

FIG. 5 shows an example process that may be used according to an embodiment of the invention. As shown in FIG. 5, when an input signal f(S)+e is received (100) the number of ones or zeros in the input signal will be counted (102). The input signal f(S)+e will then be scrambled (104) using the same scrambler that was used by a transmitter when transmitting the signal to create signal S+f(e). The descrambled signal will then be process (106) to remove any errors and recreate the original signal S transmitted by the transmitter.

The original signal S will then be scrambled (108) to create f(S). The receiver will count the number of ones or zeros in this scrambled signal f(S) (110). The number of ones in the scrambled signal f(S) will be compared with the number of ones in the input signal f(S)+e (112). Equivalently, the number of zeros in the scrambled signal f(S) may be compared with the number of zeros in the input signal f(S)+e. Any imbalance 34 in the number of ones (or zeros) in these two signals may be used to adjust a decision threshold 54 used by O-E physical interface 28 (114) to enable the O-E physical interface to be tuned to more reliably generate electrical signals from received optical signals.

Although an O-E physical interface has been used as an example thresholding interface, the techniques described herein may be used in other interfaces that utilize thresholds to make binary decisions related to received signals. For example, in a wireless context the wireless signals received on an antenna will be thresholded to determine whether the signal should be output as a zero or one. Accordingly, the invention is not limited to an embodiment in which an optical physical layer is being utilized, but rather embodiments of the invention may utilize these techniques in connection with receiving electrical signals and wireless signals as well.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of adjusting a symbol decision threshold at a receiver in a communication network, the method comprising the steps of:
    receiving a signal by the receiver, the signal containing a data component and an error component;
    counting a number of ones or zeros of the received signal containing the data component and the error component;
    error correcting the received signal to remove the error component from the signal to isolate the data component;
    counting a number of ones or zeros in the data component;
    comparing the number of ones or zeros in the data component with the number of ones or zeros of the received signal to determine the number of ones or zeros in the error component; and
    utilizing the determined number of ones or zeros of the error component to adjust a symbol decision threshold at the receiver.

2. The method of claim 1, wherein the received signal is scrambled.

3. A method of adjusting a symbol decision threshold at a receiver in a communication network, the method comprising the steps of:
    receiving a signal by the receiver, the signal containing a data component and an error component;
    counting a number of ones or zeros of the error component to isolate the number of ones or zeros of the error component; and
    utilizing the counted number of ones or zeros of the error component to adjust a symbol decision threshold at the receiver;
    wherein the step of counting a number of ones or zeros of the error component comprises the steps of:
        counting a number of ones or zeros of the received signal;
        correcting the received signal to remove the error component from the signal to isolate the data component;
        counting a number of ones or zeros in the data component; and
        comparing the number of ones or zeros in the data component with the number of ones or zeros of the received signal to isolate the number of ones or zeros in the error component;
    wherein the received signal is scrambled;
    the method further comprising the step of unscrambling the signal before performing the step of correcting the received signal to remove the error component.

4. The method of claim 3, further comprising the step of scrambling the data component before performing the step of counting a number of ones or zeros in the data component.

5. A method of adjusting a symbol decision threshold at a receiver in a communication network, the method comprising the steps of:
    receiving a signal by the receiver, the signal containing a data component and an error component;
    isolating a number of ones or zeros of the error component; and
    utilizing the isolated number of ones or zeros of the error component to adjust a symbol decision threshold at the receiver;
    wherein the step of isolating a number of ones or zeros of the error component comprises the steps of:
        counting a number of ones or zeros of the received signal;
        correcting the received signal to remove the error component from the signal to isolate the data component;
        counting a number of ones or zeros in the data component; and
        comparing the number of ones or zeros in the data component with the number of ones or zeros of the received signal to isolate the number of ones or zeros in the error component; and
    wherein the step of comparing the number of ones or zeros in the data component with the number of ones or zeros of the received signal comprises subtracting the number of ones or zeros in the data component from the number of ones or zeros of the received signal.

6. A method of adjusting a symbol decision threshold at a receiver in a communication network, the method comprising the steps of:
   receiving a signal by the receiver, the signal containing a data component and an error component;
   isolating a number of ones or zeros of the error component; and
   utilizing the isolated number of ones or zeros of the error component to adjust a symbol decision threshold at the receiver;
   wherein the step of isolating a number of ones or zeros of the error component comprises the steps of:
      counting a number of ones or zeros of the received signal;
      correcting the received signal to remove the error component from the signal to isolate the data component;
      counting a number of ones or zeros in the data component; and
      comparing the number of ones or zeros in the data component with the number of ones or zeros of the received signal to isolate the number of ones or zeros in the error component; and
   wherein the step of comparing the number of ones or zeros in the data component with the number of ones or zeros of the received signal comprises subtracting the number of ones or zeros of the received signal from the number of ones or zeros in the data component.

7. The method of claim 1, wherein the step of comparing comprises determining the number of ones of the error component and, if the determined number of ones in the error component is positive, the step of utilizing the determined number of ones or zeros of the error component comprises the step of increasing a symbol decision threshold at the receiver.

8. The method of claim 1, wherein the step of comparing comprises determining the number of ones of the error component and, if the determined number of ones in the error component is negative, the step of utilizing the determined number of ones or zeros of the error component comprises the step of decreasing a symbol decision threshold at the receiver.

9. The method of claim 1, wherein the step of comparing comprises determining the number of zeros of the error component and, if the determined number of zeros in the error component is positive, the step of utilizing the determined number of ones or zeros of the error component comprises the step of decreasing a symbol decision threshold at the receiver.

10. The method of claim 1, wherein the step of comparing comprises determining the number of zeros of the error component and, if the determined number of zeros in the error component is negative, the step of utilizing the determined number of ones or zeros of the error component comprises the step of increasing a symbol decision threshold at the receiver.

11. A method of adjusting a symbol decision threshold at a receiver in a communication network, the method comprising the steps of:
    receiving a scrambled signal by the receiver, the signal containing a data component and an error component;
    counting a number of zeros or ones of the received signal;
    unscrambling the signal;
    performing error correction on the signal to remove the error component to isolate the data component;
    scrambling the data component;
    counting a number of zeros or ones of the scrambled data component;
    comparing the counted number of zeros or ones of the received signal and the counted number of zeros or ones of the scrambled data component; and
    using a result of the step of comparing the counted number of zeros or ones of the received signal and the counted number of zeros or ones of the scrambled data component to adjust a symbol decision threshold at the receiver.

12. The method of claim 11, wherein the step of scrambling the data component uses a scrambler that is the same as a scrambler used to create the scrambled signal by a transmitter prior to transmission to the receiver.

13. The method of claim 11, wherein if the step of counting a number of zeros or ones of the received signal is performed by counting a number of zeros of the received signal, then the step of counting a number of zeros or ones of the scrambled data component is performed by counting a number of zeros of the scrambled data component.

14. The method of claim 11, wherein if the step of counting a number of zeros or ones of the received signal is performed by counting a number of ones of the received signal, then the step of counting a number of zeros or ones of the scrambled data component is performed by counting a number of ones of the scrambled data component.

15. A receiver, comprising:
    a physical interface using at least one threshold to make symbol decisions on a received signal;
    a descrambler to descramble the received signal;
    an error corrector to remove an error component from the received signal to extract a data component;
    a scrambler to scramble a data component; and
    a comparator to compare a number of ones or zeros in the received signal with a number of ones or zeros in the scrambled data component.

16. The receiver or claim 15, wherein the at least one threshold is adjustable and wherein the physical interface uses a result of the comparator to adjust the at least one threshold.

* * * * *